Patented July 5, 1927.

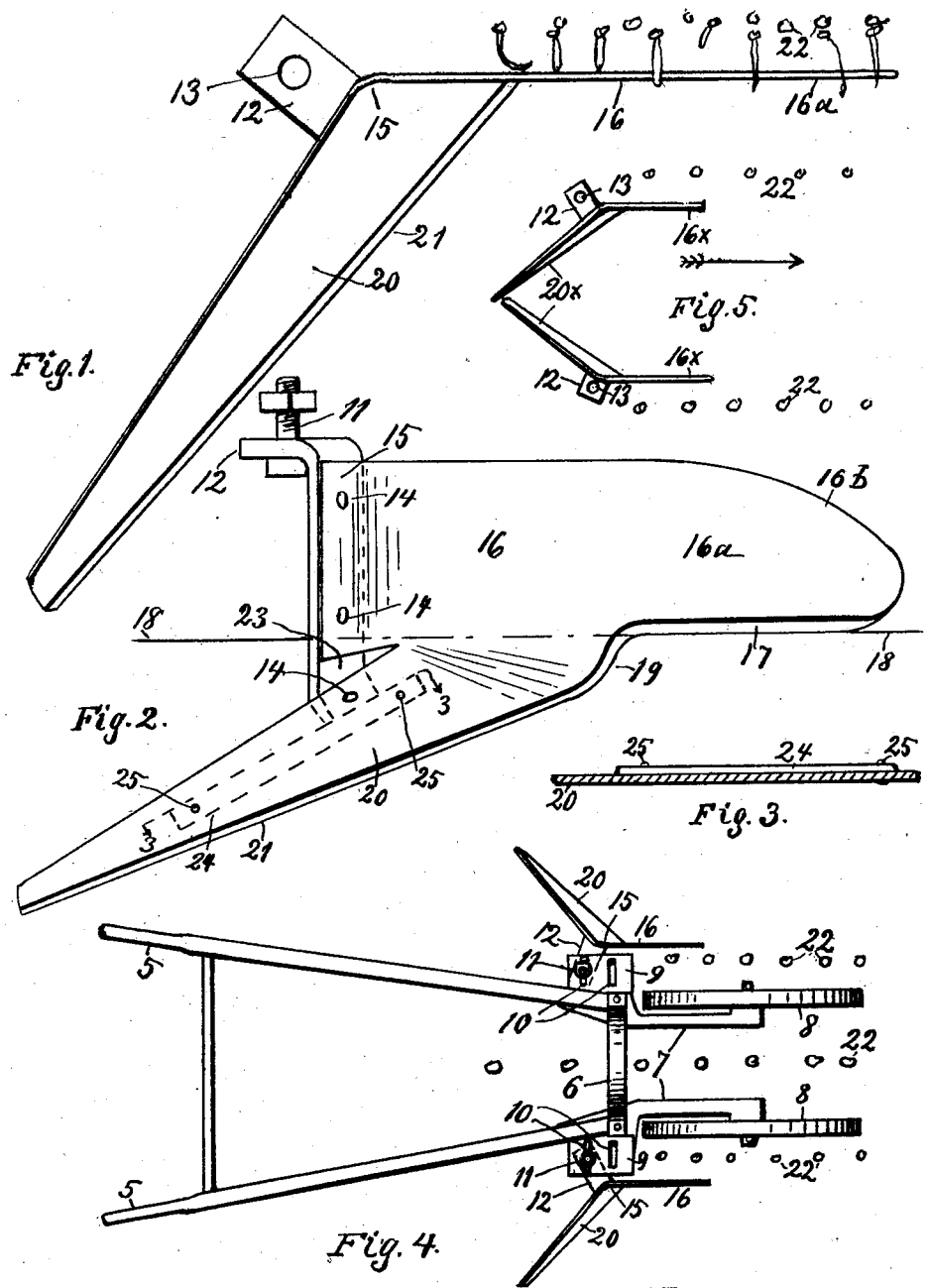

1,634,531

UNITED STATES PATENT OFFICE.

FRANK ROBERT BERGSTEN, OF ELK RIVER, MINNESOTA.

CULTIVATOR BLADE.

Application filed April 26, 1926. Serial No. 104,579.

My invention relates to cultivator blades and the object is to provide cultivators in general but especially hand operated garden cultivators with improved blades, or teeth, that will raise leaning or fallen plants and guard them from damage by the earth and roots stirred up by the cultivator. Another object is to provide a cultivator tooth or hoe of considerable strength although made of inexpensive thin sheet metal.

In the accompanying drawing:

Fig. 1 is a top view of one of my improved cultivator blades.

Fig. 2 is a side elevation of Fig. 1 with a bolt added.

Fig. 3 is a section on line 3—3 in Fig. 2.

Fig. 4 is a plan view of a garden cultivator, also called a "wheel hoe" equipped with my invention.

Fig. 5 shows the cultivator blade in a modified position.

Referring to the drawing by reference numerals, 5 designates the handles and 6 the usual arch of a frame 7 secured to the handles and supported by one or two ground wheels 8. The frame has at each side a horizontal plate 9 with one or two transverse slots 10.

In one of said slots in each plate is placed a bolt 11, on which is secured a horizontal lug 12 having a hole 13 for said bolt and being secured by rivets 14 to the curved rear end portion 15 of a normally vertically disposed cultivator blade 16 the front half, 16ª, of which has its lower edge cut away so as to ride as at 17 just in contact with the ground 18 while the rear half of the blade has a downwardly offset front edge 19 cutting the desired depth in the ground and is extended as an inclined and laterally diverging wing 20 having a forward edge 21 cutting the roots of weeds found between the rows of plants 22.

The advance portion 16ª of the blade entirely prevents weeds from falling against the plants, while the inclined upper edge 16ᵇ raises up any plant fallen or leaning too much out from the row. Such separating of the weeds from the plants is finally completed by the curved portion 15 of the blade.

To save material in forming the blade I give it a slit 23 which enables the wing 20 to be spread considerably out laterally. I further economize on material by using sheet metal so thin that the weakest point of the blade is re-enforced by a flat metal strip 24, secured by rivets 25.

These new cultivator blades are capable of exchange of position the same as in other cultivators. That is to say they may be used as shown in Fig. 4 or they may be exchanged to the position indicated at 16ˣ and 20ˣ in Fig. 5 so that they converge almost together at their rear ends in which position it is preferable to have one blade secured in the front slot 10 and the other in the rear slot 10 at the other side of the cultivator as that will cause the trails of the blades 20ˣ to overlap slightly.

What I claim is:

1. A cultivator blade adapted to be secured to a cultivator, said blade consisting of a metal blade having an elongated normally vertical front portion with its upper edge slanting forwardly and downwardly and its lower edge arranged to ride practically on the surface of the ground, the rear half or portion of the blade being deeper and having a sharp cutting edge and a laterally diverging inclined wing with a sharp front edge.

2. The structure specified in claim 1 in which said rear end portion of the blade has a lateral curve toward the same side that has the wing.

3. The structure specified in claim 1, in which the said wing has a longitudinal reenforcing strip secured upon its rearward side.

4. The structure specified in claim 1, in which the said wing has a longitudinal reenforcing strip secured upon its rearward side, said plate having said wing partly cut loose and spread from the body of the plate, and a metal strip riveted to the plate and its wing across the cut and having its upper end formed into a perforated lug by which to bolt the device to a cultivator frame.

In testimony whereof I affix my signature.

FRANK ROBERT BERGSTEN.